United States Patent [19]
Herber et al.

[11] Patent Number: 6,087,438
[45] Date of Patent: Jul. 11, 2000

[54] COATING MIXTURES, METHOD OF PRODUCING THEM AND THEIR USE FOR COATING PURPOSES

[75] Inventors: Jürgen Herber, Giessen; Jan Mazanek, Köln; Karl-Heinz Käsler, Bergisch Gladbach; Gebhard Wagner, Odenthal, all of Germany

[73] Assignees: GE Bayer Silicones GmbH & Co. KG, Erkrath; Weilburger Lackfabrik J. Grebe GmbH, Weilburg, both of Germany

[21] Appl. No.: 09/011,535

[22] PCT Filed: Jul. 29, 1996

[86] PCT No.: PCT/EP96/03337

§ 371 Date: Feb. 3, 1998

§ 102(e) Date: Feb. 3, 1998

[87] PCT Pub. No.: WO97/06220

PCT Pub. Date: Feb. 20, 1997

[30] Foreign Application Priority Data

Aug. 8, 1995 [DE] Germany .......................... 195 29 093
Oct. 24, 1995 [DE] Germany .......................... 195 39 446

[51] Int. Cl.$^7$ ..................................................... C08K 3/36
[52] U.S. Cl. .......................... 524/588; 524/860; 524/861; 524/492; 524/494; 525/477
[58] Field of Search ................................. 524/588, 860, 524/861, 492, 494; 525/477; 427/387

[56] References Cited

U.S. PATENT DOCUMENTS

| | | |
|---|---|---|
| 2,457,971 | 1/1949 | Voorhees ................................. 252/313 |
| 2,574,902 | 11/1951 | Bechtold et al. ....................... 252/313 |
| 2,650,200 | 8/1953 | Iler et al. ................................ 252/313 |
| 2,668,149 | 2/1954 | Iler ......................................... 252/313 |
| 2,892,797 | 6/1959 | Alexander et al. ..................... 252/313 |
| 4,027,046 | 5/1977 | Bohm et al. ......................... 426/330.3 |
| 4,385,158 | 5/1983 | Mikami et al. ......................... 525/476 |
| 4,769,412 | 9/1988 | Inoue et al. ............................. 524/431 |
| 5,302,683 | 4/1994 | Weidner et al. ......................... 528/21 |
| 5,584,921 | 12/1996 | Wagner et al. ...................... 106/287.1 |
| 5,847,037 | 12/1998 | Mazanek et al. ....................... 524/413 |

*Primary Examiner*—Robert Dawson
*Assistant Examiner*—Kuo-Liang Peng
*Attorney, Agent, or Firm*—Norris, McLaughlin & Marcus, P.A.

[57] ABSTRACT

The invention relates to coating mixtures, containing in the anhydrous state at least one polysiloxane, at least one reactive inorganic filler, at least one inorganic material which is film-forming as melt and at least one reactive (oligo)silane, a process for manufacture and their use.

12 Claims, No Drawings

COATING MIXTURES, METHOD OF PRODUCING THEM AND THEIR USE FOR COATING PURPOSES

The invention relates to coating mixtures, containing in the anhydrous state at least one polysiloxane, at least one reactive inorganic filler, at least one inorganic material which is film-forming as melt and at least one reactive (oligo)silane, a process for manufacture and their use.

A multiplicity of mixtures comprising at least one polysiloxane and at least one inorganic filler, which are used in a very wide range of fields, has been known hitherto. Mixtures consisting of a polysiloxane resin as polysiloxane and a pigment as filler, so-called pigmented polysiloxane resins, are used both as lacquer systems and in coating technology. Both pigmented polysiloxane resins in organic solvents and inorganic coatings of enamel have been used hitherto as heat-resistant coatings. Pigmented polysiloxane resins only have a good property profile, however, When they are used in organic solvents. Inorganic coatings of enamel are distinguished by high heat resistance. The fact that they are brittle and only achieve their final properties by means of stoving at temperatures >400° C. is, however, a disadvantage. For this reason they are easily damaged, particularly in the transport phase and until the necessary temperature has been reached, so that enamel cannot be used as a coating in many fields.

High-temperature-resistant systems have only been achieved hitherto with exclusive use of solvent-based silicone resins, optionally with the addition of silicone oils as flow control or release agents. Corresponding coatings are composed of the resin as binder, pigments, additives (catalysts, emulsifiers, flow control agents etc.) and various solvents. The current aqueous systems have disadvantages, particularly in respect of their behaviour following drying at room temperature. Unsatisfactory corrosion protection, inadequate hardness and film strength (bond strength), drying times which are too long (slurries) and insufficient storage stability are further disadvantages.

Heat-resistant coatings are chiefly used to protect objects and installations of the most varied kind, such as silencers, furnaces, petrochemical industry installations, housings for items of equipment, combustion plants etc.

Examples of the requirements which heat-resistant coatings are expected to meet are temperature resistance up to 600° C. under long-term and cyclic stress, high resistance at temperature differences ($\Delta T$ resistance), high bending strength, colourfastness, resistance to corrosive effects, good drying properties, good adhesion, simple manufacturing process (high storage stability) and good handle-ability and usability in the conventional processes such as spray, roller, dip or brush application.

A high-temperature-resistant corrosion protection coating is produced for example by drying at room temperature and subsequent stoving.

In mixtures for heat-resistant coatings known hitherto, it was not possible either to dispense with the use of an organic solvent, or provide a correspondingly optimized enamel or an optimal combination of polysiloxane and enamel.

The object of the invention was therefore to provide stable, low-solvent polysiloxane-based coating mixtures which are as free from organic solvents as possible, which can be used as heat-resistant coatings in particular and which are distinguished by an improved property profile compared with the prior art.

It has now been found that coating mixtures, containing in the anhydrous state

A) at least one polysiloxane,
B) at least one reactive inorganic filler,
C) at least one inorganic material which is film-forming as melt, and
D) optionally pigments and/or unreactive fillers and
E) at least one reactive (oligo)silane,
F) optionally catalysts and
G) further fillers, in certain proportions, have outstanding properties compared with the prior art.

The invention thus provides coating mixtures, containing in the anhydrous state

A) 20 to 40 wt. %, preferably 20 to 35 wt. %, particularly preferably 20 to 30 wt. % of at least one polysiloxane,
B) 2 to 30 wt. %, preferably 2 to 20 wt. %, particularly preferably 2 to 15 wt. %, most particularly preferably 2 to 10 wt. % and/or 5 to 10 wt. % of at least one reactive inorganic filler,
C) 5 to 50 wt. %, preferably 20 to 40 wt. %, particularly preferably 20 to 35 wt. %, most particularly preferably 20 to 30 wt. % of at least one inorganic material which is film-forming as melt and optionally
D) 0 to 40 wt. %, preferably 1 to 30 wt. %, particularly preferably 3 to 20 wt. % of an unreactive filler and/or pigment or a mixture of several fillers and/or pigments
E) 0.1 to 10 wt. %, preferably 0.5 to 5 wt. %, particularly preferably 1 to 3 wt. % of at least one reactive (oligo) silane,
F) 0 to 1 wt. %, preferably 0.01 to 0.5 wt. %, particularly preferably 0.01 to 0.3 wt. % of at least one catalyst and
G) 0 to 5 wt. %, preferably 0.1 to 3 wt. % of a further additive or a mixture of several additives, wherein the sum of components A) to G) is 100%.

In the coating mixtures according to the invention, the content of D) is preferably at least 1 wt. %, that of F), preferably at least 0.05 wt. %.

In the coating mixtures according to the invention, component A) is preferably at least one hydroxy- and/or alkoxy-functional polysiloxane which forms emulsions with water or other solvents in a mixture with water. Examples of polysiloxanes in the meaning of the invention are copolymers of polysiloxane and polyester, polyether and/or polyepoxide (and/or their mixtures), as well as linear or branched organopolysiloxanes. A polysiloxane resin or a mixture of several polysiloxane resins, as described in lines 14–52 of column 3 of EP-A 512 418, is preferably used as component A). Particularly preferred are polysiloxane resins which have a content of 10–80, preferably 20–70, particularly preferably 35–60 wt. % of difunctional structural elements of the general formula

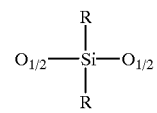
(I)

in which

R denotes any organic group with Si-C linkage.

Combinations of branched and linear polysiloxanes are also particularly preferred.

Component A) is preferably used as aqueous emulsion. The use of A) in an organic solvent is also possible, but has ecological drawbacks.

Component A) may also, however, be present as a mixture of several aqueous emulsions. If component A) is used in the form of an aqueous emulsion, the siloxane content is between 5 and 80 wt. %, preferably between 10 and 70 wt.

%, particularly preferably between 20 and 60 wt. %. Component A) may, however, optionally contain further solvents in addition to water. In this case at least one emulsifier and/or a rheological additive, such as a thickening agent, should preferably be added. Both cationic and anionic emulsifiers may be used as emulsifiers. Component A) present in the form of an emulsion may contain emulsifiers, thickening agents and also other auxiliary substances in quantities of 0.5–15 wt. %, preferably 1–6 wt. %, particularly preferably 1.5–5 wt. %.

Component A) may also contain 0–5 wt. %, preferably 0–2 wt. %, particularly preferably 0–1 wt. % of a bactericide or fungicide as a further additive. Component A) may consist both of pure polysiloxanes and/or oils and also be present in the form of corresponding emulsions in water and in a mixture with water and further solvents. Component A) may also additionally contain catalysts. The catalyst content may be up to 1 wt. %, related to component A), wherein conventional condensation catalysts, such as organotin compounds, organotitanium compounds and organoaluminium compounds may be used.

In the coating mixtures according to the invention, component B) encompasses all reactive inorganic compounds or inorganic compounds modified with organic groups which contain reactive groups and which can react with themselves and/or other components of the mixtures according to the invention. Some examples of component B) are silica sols, alkali water glasses, silicic acid esters, organosiliconates, such as sodium methyl siliconate, titanic acid esters, aluminates, zircon aluminates, aluminium hydroxide and organically modified fillers of all kinds which contain reactive group in the above-mentioned meaning of the term, such as fillers containing epoxy, amino or unsaturated groups, examples of which are quartz, glass, talcum, chalk. The term fillers also includes substances which are present as solid compounds and/or reaction products after the reaction according to the invention. Liquid titanic esters, for example, which are incorporated into the coatings may thus act as educts.

In the coating mixtures according to the invention, the reactive inorganic filler B) is preferably colloidal silica in the form of a silica sol, alkali water glasses in aqueous solution or in solid form, alkyl siliconate, aluminium hydroxide or a mixture of these compounds. Sodium or potassium methyl siliconate is particularly preferred as alkyl siliconate. The colloidal silica preferably has a content of 5–60 wt. % of $SiO_2$, preferably 10–40 wt. % of $SiO_2$, particularly preferably 15–35 wt. % of $SiO_2$. In a preferred embodiment of the invention B) is a colloidal silica sol with a solids content of 5 to 60 wt. % and/or an alkali water glass of sodium, potassium or lithium with a molar ratio of $Me_2O:SiO_2>1.2$, where Me=Na, K or Li. A reactive inorganic filler in the meaning of the invention is also pyrogenic silica in powder form and colloidal silica in the form of silica sols. The silica sol particles may also be surface-modified according to the known processes. Modified silica sol, as described in DE-B 2 408 896, U.S. Pat. No. 2,892,797, U.S. Pat. No. 2,574,902, U.S. Pat. No. 2,457,971, U.S. Pat. No. 2,668,149 and U.S. Pat. No. 2,650,200, is also preferred as component B). Silica sols with a particle size of 5–100 nanometers are particularly preferred, 10–30 nanometers being most particularly preferred.

In the coating mixtures according to the invention, component C) may be any inorganic material which is film-forming in the melt. The material (C) which is film-forming in the melt is preferably an enamel and/or a low-melting glass.

The following special compositions (in wt. %) are particularly preferred as enamel C) in the meaning of the invention:

| Compound | Content in wt. % | |
|---|---|---|
| $SiO_2$ | 25–45 | |
| $TiO_2$ | 10–27 | |
| $ZrO_2$ | 0–10 | |
| $P_2O_5$ | 0–7 | |
| $V_2O_5$ | 0–15 | |
| $B_2O_3$ | 0–15 | |
| $Al_2O_3$ | 0–5 | |
| $R_2O$ | 20–38 | where $R_2O$ = $Na_2O$ 10–20, $K_2O$ 2–15, $Li_2O$ 0–8 |
| RO | 0–14 | where RO = CaO 0–8, MgO 0–10, BaO 0–10, ZnO 0–8 |
| $F^-$ | 0–4 | |

These may be mixed up to 10% with colour oxides ($Fe_2O_3$, CoO, CuO) and up to 10% of melt-active substances such as SnO, $Bi_2O_3$ and $MoO_3$.

The low-melting glass and/or enamel in the meaning of the invention should have a softening point below 600° C., preferably <550° C., particularly preferably <440° C. but not below 200° C., preferably not below 300° C. and particularly preferably not below 350° C. The coefficient of thermal expansion of the low-melting glass and/or enamel should be adapted to that of the metallic substrate, so that the coatings will not spall on heating. The coefficient of thermal expansion of the low-melting glass and/or enamel should be at least $380\times10^{-7}$/K, preferably $>400\times10^{-7}$/K (measured cubically, between 20° C. and 400° C.), wherein a coefficient of expansion greater than $550\times10^{-7}$/K is less preferred. When manufacturing, processing and also using the glass and/or enamel, the use of low-melting physiologically unacceptable or toxic elements, such as lead, cadmium, is less preferred. To produce the enamels and/or glasses according to the invention, common commercial enamel raw materials such as borax ($Na_2B_4O_7\times5H_2O$), ground quartz, sodium polyphosphate, feldspar, zircon sand, fluorspar, alkali and alkaline earth carbonates, titanium dioxide, vanadium pentoxide and optionally colour oxides ($Fe_2O_3$, MnO, CoO, CuO etc.) are melted at temperatures of 1100 to 1260° C. and quenched over water-cooled rollers. The flakes thus produced are then milled either dry, or wet using various mill additives and further processed. Milling auxiliary substances such as glycols, silicone oils or the like may optionally be used when dry-milling.

Component D) in the meaning of the invention is preferably a pigment, iron oxide and/or a mica. Particularly preferred as component D) is a pigment or filler in the form of an inorganic, organic and/or metallic substance or mixtures thereof, such as aluminium oxide, phosphates and/or carbonates, carbides of magnesium and calcium, nitrides, magnesium oxide, aluminium hydroxide, titanium dioxide, silicon carbide, zinc oxide, aluminium bronze, tin and zinc dust, zinc phosphate, phthalocyanine blue, various spinels, carbon black, graphite etc. Most particularly preferably D) are inorganic thermostable pigments and/or at least one inorganic filler, such as iron oxide, mica and titanium dioxide.

Component E) in the meaning of the invention preferably comprises (oligo)silanes and/or (partial) hydrolyzates thereof and/or mixtures of different (oligo)silanes and/or (partial) hydrolyzates thereof. They may be present in the form of their aqueous solutions and/or emulsions or dispersions. Solutions of component E) in water are most particularly preferred. Water-soluble partial hydrolyzates of functional silanes, e.g. silanes containing amino groups, epoxy and/or hydroxyl groups, such as 3-aminopropyl trisalkoxysilane, epoxypropyl trisalkoxysilane, 3-hydroxypropyl trisalkoxysilane, and silanes containing carboxyl groups may be mentioned as preferred component E).

Those catalysts which accelerate condensation reactions are preferably considered at component F). Catalysts for the reaction of hydroxyl groups in silanols and/or for the reaction of silanols with alkoxy-silane groups, such as organometallic compounds of tin, are particularly preferred. Typical examples of component F are dibutyltin dilaurate or dibutyltin dioctoate.

Component G) may also be any additive which is known for the manufacture of lacquers and paints, such as fillers and pigments, mica, lacquer additives such as dispersing, flow control, thickening, de-foaming agents and other auxiliary substances, fungicides, bactericides, stabilizers, inhibitors and catalysts. G) may, however, also be a polymer or a mixture of several polymers, such as cellulose, polyether, polyacrylates, polyurethanes, plasticizers and various inorganic resins.

As component G) the coating mixtures according to the invention may also contain organic, organometallic and/or inorganic corrosion inhibitors, such as phosphoric acid derivatives, various amines, substituted benzene triazoles, nitrosophthalic acid salts, Talmin, zinc salts of organic acids of nitrogen such as Alcophor®827, (Henkel), substituted phenols or the like, or also wetting agents.

The invention also provides coating mixtures obtainable by:

presenting 2 to 30 wt. %, preferably 2 to 20 wt. %, particularly preferably 2 to 15 wt. %, most particularly preferably 5 to 10 wt. %, of at least one component B) as aqueous dispersion, stirring in 0 to 5 wt. %, preferably 0.01 to 0.5 wt. %, particularly preferably 0.1 to 0.3 wt. % of wetting agent (component G), 0 to 40 wt. %, preferably 1 to 40 wt. %, particularly preferably 1 to 30 wt. %, most particularly preferably 3 to 20 wt. %, of component D), 5 to 50 wt. %, preferably 20 to 40 wt. %, particularly preferably 20 to 35 wt. %, most particularly preferably 20 to 30 wt. % of at least one component C), then adding 0.1 to 10 wt. %, preferably 0.5 to 10 wt. %, particularly preferably 1 to 10 wt. %, most particularly preferably 1 to 3 wt. % of at least one reactive (oligo) siloxane (component E) and optionally further components G) accompanied by stirring and adding 20 to 40 wt. %, preferably 20 to 35 wt. %, particularly preferably 20 to 30 wt. % of at least one component A) and 0 to 1 wt. %, preferably 0.01 to 0.5 wt. %, particularly preferably 0.01 to 0.3 wt. % of component F) and optionally further components G), wherein the sum of all components G) is. 0 to 5 wt. %, accompanied by stirring.

The invention also provides a process for the manufacture of the coating mixtures according to the invention, according to which, in the quantities according to the invention:

component B) is presented as aqueous dispersion, optionally wetting agent as component G), optionally non-reactive inorganic pigments, fillers and at least one component C) are stirred into the aqueous dispersion of component B) and are then mixed preferably for 5 to 60 minutes, component E) and optionally further components G) are added accompanied by stirring and then at least one component A) and optionally component F) as well as optionally further components G), wherein the sum of all components G) is 0 to 5 wt. %, are metered in accompanied by stirring.

It is particularly preferred that the coating mixtures be manufactured by the process according to the invention. This process improves both the properties of the coatings and the quality of the lacquers/paints from which the coatings according to the invention are produced.

In a particularly preferred embodiment of the invention, in the quantities according to the invention:

1) aqueous silica sol is presented as component B), after which 2) in the sequence which follows, wetting agent (component G)), non-reactive inorganic pigments (component D)) and component C) are added accompanied by stirring and then intensively dispersed for 5 to 60 minutes, preferably 10 to 30 minutes, 3) reactive (oligo)silane comprising 3-aminopropyl trisethoxysilane (component E)) and optionally further components G) are then added accompanied by stirring and dispersed for 5 to 60 minutes, preferably 10 to 30 minutes and 4) finally, component A) and optionally catalyst (component F)) and optionally further components G), wherein the sum of all components G) is 0 to 5 wt. %, are added and stirred for 5 to 60 minutes, preferably 10 to 30 minutes.

The methods used to produce lacquers, such as ball mills and other intensive mixing processes, are preferred for producing the dispersions comprising components A) to F). The use of various auxiliary substances, particularly dispersing agents, such as polyacrylic acid derivatives, polyphosphates, phosphonocarboxylic acid derivatives, is preferred in the production of these coating mixtures. To stabilize the coating systems according to the invention and their components and to protect against sedimentation, various organic and inorganic compounds, such as bentonite, celluloses, polyacrylates or polyurethane thickeners, may be used.

The dispersions comprising the mixtures according to the invention contain 20–90 wt. %, preferably 40–80 wt. %, particularly preferably 50–70 wt. % of solids. The aqueous phase may optionally contain organic solvents.

The invention also provides a process for the manufacture of coatings from the coating mixtures according to the invention, wherein the coating mixtures are applied to the material to be coated, optionally pre-dried at room temperature and then exposed to temperatures of 150 to 750° C., preferably 150 to 700° C., for 1 to 120 minutes. The coating mixtures are preferably used in the form of an aqueous dispersion.

Virtually all heat-resistant substances, such as steel, aluminium and also other metals and their alloys, enamelled materials and metal-coated steels, may be used as materials to be coated. These materials may be used with or without pre-treatment depending on type and field of application. Any pre-treatment may be carried out by all known methods, such as abrasive blasting treatment.

The coating mixtures according to the invention are preferably applied to a solid substrate by spray, dip, roller and brush application methods. Coatings with film thicknesses of 5–300 µm, preferably 10–150 µm, particularly preferably 15–75 µm, may be produced in this way according to requirements.

The coating mixtures applied may also be pre-dried at higher temperatures. As a coating on the solid substrate, the coating mixtures pre-dried at room temperature already have sufficient mechanical strength to be transported, deformed and handled in other ways, but the final applicational properties are only achieved after heat treatment. In this case, short-term treatment at higher temperature or, by analogy, a longer period of treatment at low temperature may be carried out. The preferred temperature range is between 150 and 700° C., preferably between 200 and 600° C. The duration of the heat treatment may be between 1 and 120 minutes, preferably 5–60 minutes.

The invention also provides the use of the coating mixtures according to the invention for the heat-resistant coating of furnaces, silencers, industrial plants and objects of all kinds which are exposed to heat. Depending on prior heat treatment, these heat-resistant coatings represent soft to very hard films and differ fundamentally, as far as their properties are concerned, from those of the raw materials used since these were selected in such a way that they can react together to different degrees depending on the temperature range. The property profile of the coatings produced depends very considerably on the temperature selected. It is therefore possible to produce tailor-made coatings for each field of application on the basis of temperature.

The coatings according to the invention are chiefly distinguished by high resistance to bending, temperature and temperature difference, and resistance to corrosion, as the examples below demonstrate.

EXAMPLES

The following substances are used in the examples:
I) as polysiloxanes:
   Ia) 47% aqueous emulsion of a hydroxyfunctional methyl silicone resin of average composition $T_{210}D_{23}M_4$ with an average molecular weight of approx. 12,000
II) as reactive inorganic fillers:
   IIa) 30% aqueous colloidal silica suspension with a BET surface of 100 m$^2$/g and a pH value of 10
III) as enamel:
IIIa) VP-AI 61-1167 M: enamel frit, Messrs Email Brügge
IIIb) AT 6115®: enamel frit, Messrs Email Brügge
IV) as pigments:
   IVa) Bayferrox 303T®: black iron oxide, Messrs Bayer AG
   IVb) Echtschwarz®: black spinel, Messrs Bayer AG V) as (oligo)silane:
   Va) aminopropyl trisethoxysilane, 20% in water
VI) as catalyst:
   VIa) 10% aqueous emulsion of dibutyltin dilaurate
VII) as liquefier:
   VIIa) Bayhibit S®: sodium salt of a trifunctional phosphonocarboxylic acid, Messrs Bayer AG Comparative Example 1

Specification for producing the coating material (for quantities see Table 1, for test results see Table 2):

Water is presented and components IIIb, IVa and IVb are added accompanied by stirring, and stirred with the dissolver at approx. 1000 rpm. Component VII is then added and stirring continues for 60 minutes at 1800 rpm. This aqueous slurry is then added to the pre-mixed components I and IIa. The mixture is then stirred for 10 minutes at 1800 rpm.

Example 1a (According to the Invention)

Production process as Comparative example 1, but with the composition shown in Table 1; f or test results see Table 2:

Examples 2a to 2g

General specification for producing the coating material according to the invention (for quantities see Table 1, for test results see Table 2):

1) component IIa is presented, after which
2) in the sequence which follows, component VII, components IV and component III are added accompanied by stirring and then intensively dispersed for 20 minutes at approx. 3000 rpm,
3) component IIb is then added accompanied by stirring and dispersed for 20 minutes,
4) finally, component I and component VI are added and stirring continues for 20 minutes.

TABLE 1

Weighed portions of the components in content by weight quantities in wt. % related to dry substance are quoted in brackets

| Components | 1* | 1a | 2a | 2b | 2c | 2d | 2e | 2f | 2g |
|---|---|---|---|---|---|---|---|---|---|
| Ia | 56.30 | 53.40 | 53.40 | 42.55 | 53.40 | 53.40 | 42.55 | 64.89 | 53.40 |
|  | (26.46) | (25.10) | (25.10) | (20.00) | (25.10) | (25.10) | (20.00) | (30.50) | (25.10) |
| IIa | 27.00 | 35.33 | 35.33 | 52.33 | 35.33 | 35.33 | 29.33 | 17.33 | 35.33 |
|  | (8.10) | (10.60) | (10.60) | (15.70) | (10.60) | (10.60) | (8.8) | (5.2) | (10.60) |
| IIIa |  |  |  |  |  |  |  |  | 15.34 |
|  |  |  |  |  |  |  |  |  | (15.34) |
| IIIb | 32.50 | 30.68 | 30.68 | 30.68 | 40.00 | 21.00 | 30.68 | 30.68 | 15.34 |
|  | (32.50) | (30.68) | (30.68) | (30.68) | (40.00) | (21.00) | (30.68) | (30.68) | (15.34) |
| IVa | 16.25 | 15.30 | 15.30 | 15.30 | 11.14 | 20.14 | 15.30 | 15.30 | 15.30 |
|  | (16.25) | (15.30) | (15.30) | (15.30) | (11.1) | (20.14) | (15.30) | (15.30) | (15.30) |
| IVb | 16.25 | 15.30 | 15.30 | 15.30 | 11.14 | 20.14 | 15.30 | 15.30 | 15.30 |
|  | (16.25) | (15.30) | (15.30) | (15.30) | (11.14) | (20.14) | (15.30) | (15.30) | (15.30) |
| V |  | 11.50 | 11.50 | 11.50 | 11.50 | 11.50 | 47.50 | 11.50 | 11.50 |
|  |  | (2.30) | (2.30) | (2.30) | (2.30) | (2.30) | (9.50) | (2.30) | (2.30) |
| VIa |  | 0.20 | 0.20 | 0.20 | 0.20 | 0.20 | 0.20 | 0.20 | 0.20 |
|  |  | (0.02) | (0.02) | (0.02) | (0.02) | (0.02) | (0.02) | (0.02) | (0.02) |
| VIIa | 0.40 | 0.40 | 0.40 | 0.40 | 0.40 | 0.40 | 0.40 | 0.40 | 0.40 |
|  | (0.40) | (0.40) | (0.40) | (0.40) | (0.40) | (0.40) | (0.40) | (0.40) | (0.40) |
| Water | 43.60 | 7.64 | 7.64 |  | 7.64 | 7.64 |  | 15.00 | 7.64 |

*Comparative example

TABLE 2

Test results

| | Examples | | | | | | | | |
|---|---|---|---|---|---|---|---|---|---|
| Tests | 1 Comp. | 1a | 2a | 2b | 2c | 2d | 2e | 2f | 2g |
| Drying at RT/mins. | | | | | | | | | |
| Dust-free | 15 | 15 | 10 | 10 | 15 | 10 | 10 | 15 | 10 |
| Tack-free | 30 | 30 | 25 | 20 | 25 | 25 | 20 | 30 | 25 |
| Temperature stress | | | | | | | | | |
| 1 hr/200° C. | 0 | 0 | 0 | 0 | 0 | 0 | 0 | 0 | 0 |
| 1 hr/400° C. | 0 | 0 | 0 | 0 | 0 | 0 | 0 | 0 | 0 |
| 1 hr/600° C. | 0 | 0 | 0 | 0 | 0 | 0 | 0 | 0 | 0 |
| Temperature shock test | | | | | | | | | |
| 600° C./RT | 0 | 5 | 0 | 10 | 0 | 10 | 5 | 10 | 0 |
| Salt spray test after thermal stress | | | | | | | | | |
| RT | Ri3–4 | Ri2–3 | Ri0 | Ri3 | Ri3 | Ri2 | Ri3 | Ri0 | Ri0 |
| 1 hr/200° C. | Ri3–4 | Ri3 | Ri0 | Ri3 | Ri3 | Ri1 | Ri3 | Ri1 | Ri0 |
| 1 hr/400° C. | Ri1 | Ri1 | Ri0 | Ri1 | Ri1 | Ri0 | Ri1 | Ri1 | Ri0 |
| 1 hr/600° C. | Ri0 | Ri0 | Ri0 | Ri0 | Ri0 | Ri0 | Ri0 | Ri0 | Ri0 |

Measured variables and test conditions for evaluating heat-resistant coatings:

Temperature stress:

The measured variable is the spalled film portion in % after heat treatment at a specified time and temperature.

Temperature shock test:

The coated and pre-dried panel is exposed to a temperature of 600° C. for 1 hour and then directly quenched in 20° C. cold water. Measured variable: spalled film portion in %.

Salt spray test:

Measured variable: rust value to DIN 53 210; the comparative examples and other coatings which already exhibited spalled areas after heat treatment were not tested. The measured values have the following meaning:

| Abbreviation | rusted surface, % |
|---|---|
| Ri0 = | 0 |
| Ri1 = | 0.05 |
| Ri2 = | 0.5 |
| Ri3 = | 1 |
| Ri4 = | 8 |

What is claimed is:

1. Water-thinable coating mixtures, containing in the anhydrous state

A) 20 to 40 wt. % of at least one polysiloxane,

B) 2 to 30 wt. % of at least one colloidal silica,

C) 5 to 50 wt. % of at least one low-melting enamel having a melting point of 300° C.–700° C. and optionally D) 0 to 40 wt. % of one or more unreactive fillers or a combination thereof, E) 0.1 to 10 wt. % of at least one reactive (oligo)silane, F) 0 to 1 wt. % of at least one catalyst and G) 0 to 5 wt. % of a further additive or a mixture of several additives, wherein the sum of components A) to G) is 100%.

2. Water thinable coating mixtures according to claim 1, wherein component A) is at least one hydroxy- or alkoxy-functional polysiloxane, or a combination of both, which forms emulsions with water or other solvents in a mixture with water.

3. Water thinable coating mixtures according to claim 1, wherein the reactive inorganic filler B) is colloidal silica in the form of a silica sol.

4. Water thinable coating mixtures according to claim 1, wherein the reactive inorganic filler B) is colloidal silica sol with a solids content of 5 to 60 wt. %.

5. Coating mixtures according to claim 1, wherein the inorganic material C) which is film-forming as melt is at least one enamel, one low-melting glass or a combination thereof.

6. Water thinable coating mixtures according to claim 1, wherein the reactive (oligo)silane E) is a (partial) hydrolyzate of 3-aminopropyl-, 1,2-epoxypropyl, 3-hydroxypropyl trisalkoxysilane or a combination thereof.

7. Water thinable coating mixtures according to claim 1, wherein the further additives G) are pigments, iron oxides, mica or a combination thereof.

8. Water thinable coating mixtures according to claim 1, wherein the content of F) is at least 0.05 wt. %.

9. Water thinable coating mixtures obtainable by:

presenting 2 to 30 wt. % of at least one component B) as aqueous dispersion, stirring in 0 to 5 wt. % of wetting agents as component G), 0 to 40 wt. % of component D) and 5 to 50 wt. % of at least one component C) accompanied by stirring and optionally subsequent stirring for 5 to 60 minutes.

then adding 0.1 to 10 wt. % of at least one component E) optionally further components G) accompanied by stirring and adding 20 to 40 wt. % of at least one component A) and 0 to 1 wt. % of component F) and optionally further components G), wherein the sum of all components G) is 0 to 5 %, accompanied by stirring.

10. Process for the manufacture of the water thinable coating mixtures of claim 1, wherein 2 to 30 wt. % of at least one component B) is presented as aqueous dispersion, 0 to 5 wt. % of wetting agent, 0 to 40 wt. % of component D) and 5 to 50 wt. % of at least one component C) are stirred into the aqueous dispersion of component B), 0.1 to 1 wt. % of at least one component E) and optionally further components G) are added accompanied by stirring and then 20 to 40 wt. % of at least one component A) and 0 to 1 wt. % of component F) and 0 to 5 wt. % of component G), wherein the sum of all components G) is 0 to 5 wt. %, are metered in accompanied by stirring.

11. Process for the manufacture of coatings from water thinable coating mixtures according to claim 1, wherein the mixture is applied to the material to be coated, optionally pre-dried at room temperature and then exposed to temperatures of 150 to 750° C. for 1 to 120 minutes.

12. A heat resistant coating for furnaces, silencers, industrial plants and objects which are exposed to heat, comprising the water thinable coating mixture of claim 1.

* * * * *